United States Patent
Ratias

(10) Patent No.: US 12,100,427 B2
(45) Date of Patent: Sep. 24, 2024

(54) SCENE-CREATION USING HIGH-RESOLUTION VIDEO PERSPECTIVE MANIPULATION AND EDITING TECHNIQUES

(71) Applicant: Cole Asher Ratias, San Rafael, CA (US)

(72) Inventor: Cole Asher Ratias, San Rafael, CA (US)

( * ) Notice: Subject to any disclaimer, the term of this patent is extended or adjusted under 35 U.S.C. 154(b) by 0 days.

(21) Appl. No.: 18/496,539

(22) Filed: Oct. 27, 2023

(65) Prior Publication Data

US 2024/0105231 A1     Mar. 28, 2024

Related U.S. Application Data

(63) Continuation of application No. 17/543,999, filed on Dec. 7, 2021, now Pat. No. 11,837,258, which is a continuation of application No. 17/076,550, filed on Oct. 21, 2020, now Pat. No. 11,222,667.

(60) Provisional application No. 62/931,715, filed on Nov. 6, 2019.

(51) Int. Cl.
| | |
|---|---|
| *G11B 27/031* | (2006.01) |
| *G06F 18/214* | (2023.01) |
| *G06T 11/60* | (2006.01) |
| *G06V 10/82* | (2022.01) |
| *G06V 20/40* | (2022.01) |
| *G11B 27/036* | (2006.01) |

(52) U.S. Cl.
CPC .......... *G11B 27/031* (2013.01); *G06F 18/214* (2023.01); *G06F 18/2148* (2023.01); *G06T 11/60* (2013.01); *G06V 10/82* (2022.01); *G06V 20/41* (2022.01); *G11B 27/036* (2013.01)

(58) Field of Classification Search
CPC .... G11B 27/031; G11B 27/036; G06V 10/82; G06V 20/41; G06F 18/2148; G06F 18/214; G06T 11/60
See application file for complete search history.

(56) References Cited

U.S. PATENT DOCUMENTS

| | | | |
|---|---|---|---|
| 10,541,000 B1* | 1/2020 | Karakotsios | ..... H04N 21/25891 |
| 10,777,228 B1* | 9/2020 | Wilson | ................... G11B 27/02 |
| 2015/0100987 A1* | 4/2015 | Whitman | ............. H04N 21/251 |
| | | | 725/53 |
| 2015/0365600 A1 | 12/2015 | Pollack | |
| 2018/0053114 A1 | 2/2018 | Adjaoute | |
| 2018/0161682 A1 | 6/2018 | Myhill | |
| 2020/0334833 A1* | 10/2020 | Gibbon | ............ H04N 21/23418 |
| 2020/0336722 A1 | 10/2020 | Gibbon | |

\* cited by examiner

*Primary Examiner* — Mishawn N. Hunter
(74) *Attorney, Agent, or Firm* — Edward C. Kwok; VLP Law Group LLP

(57) ABSTRACT

A video editing program is taught by machine learning to conform a video sequence to a known style. For example, some famous filmmakers (e.g., Steven Spielberg, Michael Bay) have signature cinematic "takes" that appear in their acclaimed works. Such takes may involve use of subject tracking, placements and movements of people or objects in the scene, and lighting intensities or shadows in the scene. The editing program may be trained to recognize video sequences that can be modified to conform to one or more of such signature styles and to offer the modification to the user at the user's option.

15 Claims, 1 Drawing Sheet

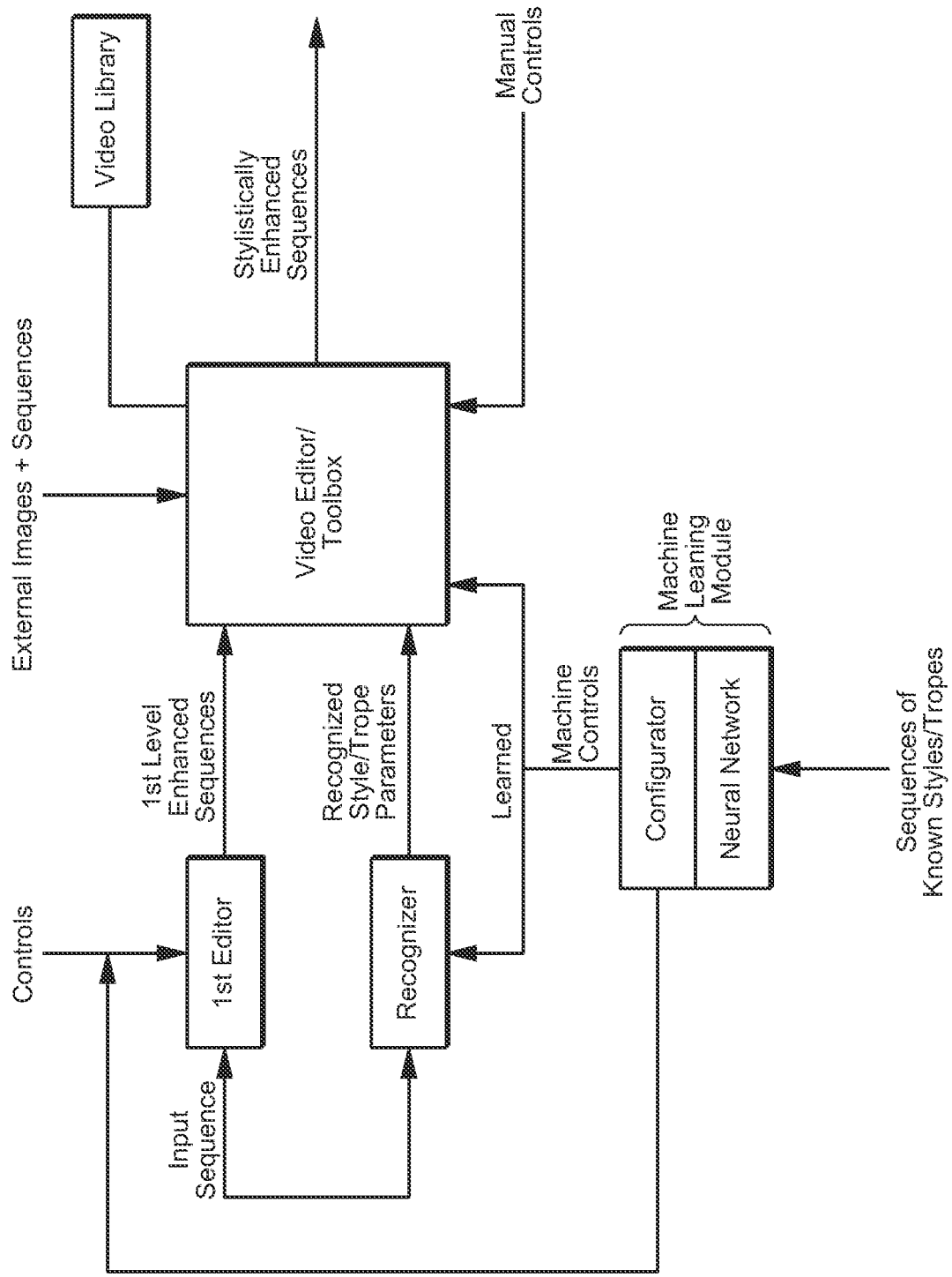

SCENE-CREATION USING HIGH-RESOLUTION VIDEO PERSPECTIVE MANIPULATION AND EDITING TECHNIQUES

CROSS REFERENCE TO RELATED APPLICATIONS

The present application is a continuation application of U.S. patent application ("Parent application"), Ser. No. 17/543,999, entitled "SCENE-CREATION USING HIGH-RESOLUTION VIDEO PERSPECTIVE MANIPULATION AND EDITING TECHNIQUES," filed on Dec. 7, 2021, which is a continuation application of U.S. patent application ("Parent application"), Ser. No. 17/076,550, entitled "SCENE-CREATION USING HIGH-RESOLUTION VIDEO PERSPECTIVE MANIPULATION AND EDITING TECHNIQUES," filed on Oct. 21, 2020, which relates to and claims priority of U.S. provisional application ("Provisional Application"), Ser. No. 62/931,715, entitled "SCENE-CREATION USING HIGH-RESOLUTION VIDEO PERSPECTIVE MANIPULATION AND EDITING TECHNIQUES," filed on Nov. 6, 2019. The Parent Application and the Provisional Application are hereby incorporated by reference in their entireties.

BACKGROUND OF INVENTION

Field of the Invention

The present invention relates to editing high-resolution video sequences. In particular, the present invention relates to editing high-resolution video sequences to enhance viewer experience, using different perspectives, cropping, zooming, panning, viewing angle transformations, other video editing techniques, and machine-learned stylistic enhancements.

SUMMARY

High-resolution still pictures and video sequences may be created today using relatively inexpensive cameras. In addition, techniques for post-processing of images using computers have made possible, automatically or by manual editing, subtle changes to achieve pleasing results. Such changes may include, for example, elimination of blemishes on faces, adjustments to skin colors or tones, more flattering body shapes (e.g., adjusting proportions), and eliminating specific persons or objects. As another example, an image or video sequence taken from one angle may be manipulated to provide a realistic resulting image or video sequence that appears as if it is taken from a different angle. Similarly, by relocating pixels in each frame according to a schedule, an illusion of motion may be introduced into a video sequence taken from a camera at a fixed position. Other visual effects, such as vignetting, zooming, panning and cropping may be introduced by post-processing of an image or video sequence in a computer. Provided the original image or video sequence has a high enough resolution, the visual effects introduced may be realistic enough as to be indistinguishable from original camera work.

In one embodiment of the present invention, the video editing program may be taught by machine learning to conform a video sequence to a known style. For example, some famous filmmakers (e.g., Steven Spielberg, Michael Bay) have signature cinematic "takes" that appear in their acclaimed works. Such takes may involve use of subject tracking, placements and movements of people or objects in the scene, and lighting intensities or shadows in the scene. The editing program may be trained to recognize video sequences that can be modified to conform to one or more of such signature styles and to offer the modification to the user at the user's option.

The methods of the present invention allows users of popular video capturing devices (e.g., smartphones) to be able enhance video quality, to approach those of professional productions, including incorporating changes that enhance viewability, understanding of story line, polarity and education purposes.

The present invention is better understood upon consideration of the detailed description below and the accompanying drawings.

BRIEF DESCRIPTION OF THE DRAWINGS

FIG. 1 shows, in accordance to one embodiment of a present invention, a machine learning module that is trained by sequences of known styles or tropes to configure (a) a recognizer module or recognition program that recognizes in an input video sequence elements that allow the input video sequence to be edited to conform to a known style or trope, and (b) a video editor program or toolbox to effectuate the editing to conform the input video sequence to the recognized style or trope; FIG. 1 also shows a first-level editor that may be used to apply basic processing and editing techniques to the input video sequence.

DETAILED DESCRIPTION OF THE PREFERRED EMBODIMENTS

The present invention uses computer image processing technique extensively to allow a user—even an amateur—to enhance any video sequence (e.g., home videos). In some embodiments, a system of the present invention may be trained by machine learning to recognize video sequences that can be edited to conform to a familiar cinematographic style (e.g., the signature cinematographic styles of famous filmmakers). Applicable machine learning techniques include supervised learning, unsupervised learning, and reinforcement learning, each of which can be implemented in many frameworks such as, for example, a neural network, a generative adversarial network (GAN) or variations of a number of suitable systems. One skilled in the art of machine learning would recognize the suitability, advantages or challenges in each of these frameworks or techniques and, accordingly, would be able to apply the suitable framework and technique based on the task at hand.

To make the video sequence interesting, images may be created by combining images not only from recorded images or video sequences taken at events involving the subject (e.g., individuals in conversation), but also recorded images or video sequences taken from contemporaneous events that occur in the same or different environment. As a first level of processing, basic techniques of image post-processing that may be applied "across-the-board" include, automatically or by manual editing, subtle changes to the images of humans or objects to achieve pleasing results. Such changes may include, for example, elimination of blemishes on faces, adjustments to skin colors or intended variation of body shapes or facial features (e.g., making torso thinner, rounder or more muscular, changing eye color, making eyes more symmetrical or larger, adding wrinkles, blemishes or freckles to faces), adding a person or object, eliminating specific persons or objects, and making a facial or body feature more "symmetric." In one embodiment, a user is offered adjustments according to predefined notions of more pleasing looks (e.g., "celebrity look alike" or "attractive" person with similar features, shapes, "broader shoulders", "10% taller", "10% longer legs", or "10% bigger (overall)").

Other variations may include substitution of a different hair style (e.g., short, long or curly), moving, lifting or pointing an arm, a leg, or a finger, and adjusting mouth, lip, tongue or tooth positions. Some subtler effects may include reflecting 180° around the vertical axis (i.e., flipping left and right). Other techniques include reassigning genders (i.e., morphing the image of a man to appear as an image of a woman). Sometimes, it may be useful to be able to edit images of a particular person or object, or a group of persons or objects (e.g., removing all women from a scene that has been transformed in a men's room). It may be also be useful to obscure sounds, voices or images. For example, it may be appropriate to obscure images of faces at certain venues, to avoid inappropriate showing of body parts (e.g., genital), to obscure private information—e.g., words or images appearing on images on the screens of a person's personal effects (e.g., tablet or notebook computers or cellular telephones)—or to eliminate spoken swear words in the audio track.

Special visual impacts may be achieved by judicious modification of lighting and its positioning. For example, to create a specific mood, various portions of a scene may be illuminated by different—but appropriate—lighting placements, e.g., soft incandescent light in the background, while providing in the corner harsher light to draw contrast and attention. For an appropriate event, sunset lighting may be appropriate. In every case, the colors and shadows associated with people or objects in the scene in which the program introduces modified lighting must be appropriately applied. Such effects include, for example, a "color wash" on people's faces and objects illuminated.

Other visual effects may be enhanced or augmented, either automatically (i.e., to conform to other modifications that are made contemporaneously) or manually. For example, enhancing the visual effects of a subject punching a wall (e.g., visually enhanced by a motion-blurred fist), or high-speed objects passing each other in near impact, may merit creating a loud "boom" in the sound track.

In this regard, many techniques known to those in the art may be applied to detect and identify a visual subject from the image (e.g., face or a body part). In fact, using machine learning techniques, the face or body part of a specific individual may be recognized. The recognized subject may be enhanced by eliminating shadows modifying the incident light color or intensity, smoothing the surface texture to eliminate blemishes (e.g., wrinkles and age spots). The visual impact of the video sequence may also be enhanced by digital zooming techniques to suitably size or fit the recognized subject to provide a more or less pleasing scene, depending on the kind of statement the creator desires to make.

The audio track may also be process for identification, detection and editing purposes. For example, identifying, detecting and editing voices of individuals, their cadence and pitches in their voices or utterances, their frequency of using certain words, or their signature timing in their utterances, between words or sentences. Detection may be used to synthesize utterances that can be used for introduction into other scenes or contexts. Modulation of voices may include, for example, to sound like a celebrity (e.g., Barack Obama or Donald Trump, or Steve Jobs), which may involve modifications of timbre, tone, cadence, accent and pitches (e.g., a deeper voice, a slower speed, etc.). Such changes may be more subtle (i.e., minor variations) that is applied to each utterance, but varies among utterances, and may be applied in different ways in conjunction with the character's movement or repetition of actions. It is observed that, in often repeated actions, each person has a slightly different style of performing the repeated action (e.g., a wave), which may serve as that person's "signature." Even for such a person, each instance of the repeated action should be rendered slightly different or should have a slightly different duration or speed. However, as applied to modification of a recorded action, the modified action should not deviate significantly from the original recorded action as to appear contrived. These subtle techniques humanize the speaker and make the resulting audio track more natural. With respect to generated sounds, the system may provide stock sound tracks from an archive—e.g., "elevator music" during the beginning of an introduction (e.g., 20 seconds)—or generate sound tracks from such basic "building block" sounds as "stream", "birds", "winds", etc.

The final product may be formed by combining cuts from multiple video sequences recorded by cameras mounted at multiple locations or shot at different times. For example, a composite video sequence may be made interesting by selecting cuts from video cameras capturing the same activities from different angles (e.g., the upper four corners of a rectangular dining room). Some desired perspectives, e.g., a different camera angle, may be artificially created from an existing image sequence using known image processing techniques. For example, in addition to zooming and panning, one may apply a "trapezoidal reshaping" to create other artifacts, such as a camera rotation. The angle at which an image of an individual faces the camera may be manipulating up to 270°, his or her head may be manipulated to appear as turning, or his or her eyes may made to appear as rotating.

In video sequences shared on social media, it is customary for the creator or others to provide additional information by tagging the subjects or by providing text annotations (e.g., summaries). In one embodiment of the present invention, in additional to providing flexible support for the user to add tags or to annotate the images, the system automatically detects and identifies subjects and appropriately tag the images with their names. Similarly, based on recognizing familiar objects or sounds, appropriate annotation may be provided. For example, when candle flames, the phrase "happy birthday" or a familiar birthday song is recognized directed to a subject, a text annotation of "Happy Birthday, _____!" may be attached to the video sequence. The system keeps track of tags or annotations it generates, so that they may be identified, enhanced or removed at the user's option. The system may also suggest appropriate humorous comments or witty aphorisms to create an appropriate atmosphere. Hyperlinks may be embedded in the tags and text annotations for a viewer to select for further activities—e.g., a hyperlink associated with the tag may take the viewer to a webpage associated with the person tagged. In some instances, tagging of a subject or object may persist throughout the video sequence, e.g., by recognizing the object or person, so as to propagate the tagging to other scenes. In some applications, only user-generated tags follow the object or person to subsequent video sequences or photographs.

In other applications, other information (e.g., related links, text, or other graphical information), for educational or other purposes, may be provided as selectable widgets or objects located in the vicinity of the displayed images (e.g., hovering or on-side of the video sequence). In a video sequence for educational purpose, for example, places for a quick "quiz" or for enabling other educational interactions may be provided. Such data may be included at predetermined time points in video, or automatically brought up when predetermined related content or objects appear in the processed video sequence. The methods of the present invention support various approaches to learning (e.g., multi-stages with reinforcement, learning from examples from the masters, and other educational materials, resources or databases). For example, an educational video on wedding video may learn from examples from various databases to include a procession. Another example may be summarizing long or a collection of multiple video sequences into a video sequence of highlights through machine-learning of aspects of highlighting, such as extracting from user feedbacks, detection of significant events captured or specification by user.

In some applications, the auxiliary content may be automatically displayed by the system's intelligence based on recognition of cinematographic vocabulary recognition (discussed in greater detail below) of such themes as a climax in video sequence's story line, most liked or watched portion of the sequence based on techniques that track viewer's concentration (e.g., viewers' eye positions indicate focus or loss of concentration).

In some applications, certain content created by the methods of the present invention may be provided access control mechanisms. For example, in addition to obscuring in appropriate content for certain viewers, screen black-out or other denial of access mechanism may be provided. User access and modification rights to the access control mechanisms may be guarded, for example, by password.

A user's own video library may be indexed and categorized to provide raw material also. For example, in processing a currently taken video sequence, a name of a place of interest (e.g., Disneyland, a particular restaurant, etc.) turns up in a conversation between the participants, the system may be enabled to retrieved from the video library "memory sequences" in which two or more of the current participants appear. At the user's option the retrieved memory sequence may be inserted into the current video sequence, in a split-screen format, as a transition between scenes or moods (e.g., interlude between happy to unhappy transitions).

The present invention allows a video sequence to be created from footages captured by cameras at predetermined, fixed positions, predetermined fields of view and predetermined angles of elevation in the scene, incorporating the various visual effects discussed above familiar to those ordinary skill in the art. For example, using the processing techniques discussed above (e.g., zooming, panning and artificial camera angles), a pleasing video sequence of a wedding ceremony may be created out of footages from high-resolution cameras mounted at selected positions of the church. Such realistic "movie" may be created from data processing even without using sophisticated equipment (e.g., rail). In one embodiment, for events such as a wedding, a system of the present invention may automatically identify, select, edit and propose footages representing sections of known significance for that event. For example, a wedding "movie" may include the procession of the bridal party, an address or homily by a presiding official, the exchange of vows and rings, the "kissing" of the bride and the recessional. For significant events such as a wedding, the system may offer to generate the "movie" in one of several different styles, at the user's option. For example, the system may offer a sequence that resemble a familiar sequence executed by a master (e.g., Michael Bay and Steven Spielberg)—with Spielberg-like order or sequence of progression, warm or nostalgic lighting schemes, variations of different themes, with signature positive or negative tones. In contrast, a Bay-like presentation would have different emphases including, for example, rapidly changing, or harsher and more aggressive tones. Such stylistic aspects may be learned from examples in video libraries or external resources.

To create the desired stylistic effects, the original video sequence may be transformed into the desired style (e.g., using a desired transition technique at the appropriate tempo). The character of the venue may be morphed into a different one (e.g., different lighting or a different room from retrieved from other footages). In any given scene, the video sequence may be edited to automatically zoom into, to follow or to the detected subject. A head-shot of the desired subject may also be framed or resized for a desired quality or a desired format ratio (e.g., a head-to-screen ratio of 3:1). The scene may also be edited to filter out other people or objects that are not in the primary focus or for greater impact (e.g., to achieve a goal, to make point, or to attain most 'likes,' purchases or engagement, or other feedback processes that impact system performance and that update, improve or maximize video desirability goals).

The relative positions of participants may also be changed. For example, under a Bay-like conversation scene, the participants are placed close to each other in a close-up shot at the beginning of the conversation, but the camera, as well as the participant, move away gradually to a wide shot at the end. In contrast, in a Spielberg-like conversation scene, the participants are introduced by a wide-angle shot of the entire room or background, alternating close-up shots of each participant individually, or the participants together, and ending up in a close-up shot of one of the participants.

In that regard, missing sequences necessary to complete the story, or to conform to a style or format, may be generated using computer graphics and animation techniques, drawing on modifiable sequences from film libraries, databases or other resources, such as on the internet). In this manner, a selected number of shorter video sequences may be combined into a longer-form to enhance viewability or simply provide a longer viewing time. Greater viewing time can also be achieved by adding appropriate content, such as by including the auxiliary content (e.g., the educational content or learning reinforcement or inducement described above).

In some instances, a selection of advanced techniques or tool boxes are made available for the user to use for the system to automatically generate) visual impacts to enhance the viewer theatrical experience and better understanding of the message the user desires to communicate. For example, lighting techniques may be used to emphasis a moral message. A "good" character may be portrayed in direct light, with little shades or shadows, while contrasting a "bad" character who is placed in overhead lighting that cast shadows on the person. Similarly, "uplifting," "downbeat," "suspense" or "melancholic" music may all be provided in the advanced techniques or tool box available for the user to use. The methods of the present invention therefore enable any person with the technological sophistication provided by the contemporary handheld device (e.g., smartphone) to have similar tools used typically professional artists or filmmakers to produce high quality, longer-form content (or shorter-form, as appropriate) with audio effects.

Still images may also be edited and incorporated into a video sequence or slideshow. For example, one technique, popularly referred to as the "Ken Burns effect" use a combination of crop, pan and zoom techniques on a still image in a video sequence. A visual impact is achieved by combining the still image with music or an audio narrative or commentary in the background.

A method of the present invention may also optimize the proposed movie to a predetermined time budget (e.g., from 10's of seconds to 30 or more minutes), which may enhance distribution and acceptability for showing on various occasions (e.g., church service or other public gatherings) where a time discipline is preferred. 10- to 30-second sequences are also suitable to be used in slots for commercial advertisement breaks. A trailer-like sequence may take up 5 minutes or less. Likewise, a "sitcom" format may take up to 30-45 minutes. Other formats may include "family primetime" format sitcoms that may be 20 minutes in length, but characterized by bright lighting, with upbeat themes and music.

Other editing options that can be made available includes access to a video library which allows a system of the present invention to include in the proposed output video stock footages that enhance its content. For example, in a video produced from videos shot on a trip to the famous landmark, a user may substitute a background filled with vendors, other tourists, or a smoggy skyline, with a professionally shot background of the landmark from a film library. In some embodiments, the replaced background is a 3-dimensional background, which allows depth modifications or adjustments to camera movement (e.g., perspective changes relevant to the camera moves toward or away from the background). The system may also handle payment of any necessary usage fee that is customary charge for incorporating an image, whether in native format, edited, changed, adjusted, satirized or otherwise modified.

In one embodiment of the present invention, a system of the present invention may be trained to detect or classify scenes in user footages ("automatic cinematographic vocabulary recognition."), or conversations in the audio track, according to archetypes of the trade's vocabulary, such as "wide frame dialogue shot," "female lead isomorphic shot," etc. Furthermore, work that resembles the signature work of the master may also be recognized. The system allows user work to be made interesting by modifying them to mimic a specific style of a famous filmmaker. For example, many cinematographic subjects (e.g., "wide frame dialogue shot," "female lead isomorphic shot," and other common subject matters) have been addressed repeatedly by many famous filmmakers in their popular works (e.g., Spielberg's "ET").

Each filmmaker's treatment of these subjects may be different. In fact, their different treatments—e.g., use of lighting conditions, contrasts, shadows, camera angles of close-up or distant shots of the participants, color schemes, intensities of the activities occurring both in the foreground and the background, placement of props, and other properties of composition—may be so distinctive as to become their signatures.

In addition to automatic cinematographic vocabulary recognition, a system of the present invention may be trained to perform "trope detection." With trope detection, the system may recognize in a user footage, for example, related properties or "trope depth" that may allow the footage to be made into a "love story." A script analysis may be used to uncover a "hero's journey" in a sequence of scenes over a broader context. To the extent that certain scenes may be missing (e.g., a Spielberg-like "love story" may require a sweeping scenic view as an introduction), such scenes may be generated using computer graphics and animation techniques, drawing on modifiable sequences from film libraries, databases or other resources, such as on the internet). In addition to trope detection based on individual scenes, trope detection of a broader scope (e.g., script analysis) can also be performed, based on detecting relationships across multiple scenes or across multiple related conversations between participants, or over a broader form content.

These techniques can be applied to generate commercial applications. Based on the styles available, the user may select a feeling or a theme for the commercial video sequence to be any or any combination of "suspenseful," "action-packed", "build up", "romantic" any other suitable theme. The methods of the present invention may modify the audio track to match the selected theme, and may also change the flow, layout and other aspects of the processed video sequence to conform to the selected theme.

The methods of the present invention have numerous other applications relating to video production. Some examples include virtual reality or augmented reality applications, such as "virtual avatars" or "virtual presence" that are added "in frame" using views from one or more cameras that are captured in real-time or asynchronously. In one application, for example, the footages are captured simultaneously using both the front and rear cameras on a portable device (e.g., a smartphone). Alternatively, footages that are captured by a remote device are "virtually" merged into a scene captured by the user holding the host device. In this manner, for example, the view of the user captured in the device the user is holding is merged into the scene captured in the remote device, thereby placing the user in the scene of the remote device. Such "telepresence" application may be a valuable technique in video production. Likewise, in a teleconferencing application, the scenes of one or more remote cameras may be merged or synchronized to the local camera, thereby allow participants of a teleconference or phone call from multiple locations to have the virtual experience of being at the same "scene" or location. One technique would be to replace the actual scene captured by the rear camera of a user by the scene captured by a current speaker's front camera.

Rather than the user himself, visually, an avatar or the user may be incorporated into the video sequence as the first person of a camera view. Additional camera views may be incorporated to provide the user alternative perspectives. Footages from multiple views captured m a single or in multiple cameras may be blended into one view. In one embodiment, for example, a vehicle simulator may use such video sequences as the visual dimension in the virtual reality created, together with real-time, simulated GPS and other input data to create the virtual reality experience.

Using machine learning techniques, a system of the present invention may be trained by sufficient examples from the works of these accomplished filmmakers (e.g., Steven Spielberg, Michael Bay) to conform a user footage to mimic some aspects of the style of a filmmaker selected by the user. To conform a footage to the selected style, the system may alter the footage by the image processing techniques discussed above, introduce necessary props, perform speech processing, filter out extraneous background noises, enhances the quality of the participants' recorded voices, mix in stock footages or soundtracks from a video library, or any of a large number of suitable video processing technique. The system may also incorporate techniques explained and exemplified by footages shared by these filmmakers themselves, often found in movie trailers (e.g., The Isle of Dog video at https://youtu.be/trWLY6NrS2Q, or the "Secret of Hope Island") The machine-learned techniques may be used to generate similar "teasers" or "trailers" to provide great user entertainment.

The detailed description herein is provided to illustrate the specific embodiments of the present invention and is not intended to be limiting. Numerous variations and modifications within the scope of the present invention are possible. The present invention is set forth in the accompanying claims.

I claim:

1. A video processing system comprising:
a video recognition program including a neural network, the neural network having been trained using machine learning techniques on examples of known cinematographic techniques and examples of elements of a known trope in video sequences or conversations, wherein the video recognition program is configured (i) according to parameter values of the trained neural network, to detect or classify elements of cinematographic vocabulary present in the examples of the known cinematographic techniques; (ii) to identify one or more sections, if any, in an input video sequence that possesses the elements of cinematographic vocabulary present in the examples of the known cinematographic techniques; and (iii) to detect or classify the elements of the known trope in one or more sections of the input video sequence or conversations in the audio track; and
a video editing program that is configured, according to a depth of the trope detected, to modify the sections of the input video sequence to conform to the known trope.

2. The video processing system of claim 1, wherein the video editing program configured to apply the known cinematographic techniques to the identified sections of the input video sequence using image processing techniques selected from the group consisting of: eliminating blemishes on faces, adjustments to skin colors or intended variation of body shapes or facial features, adding a person or object, eliminating specific persons or objects, and modifying specific proportions or shapes of a facial or body feature.

3. The video processing system of claim 1, wherein the input video sequence results from combining video sequences taken at multiple contemporaneous events.

4. The video processing system of claim 1, wherein the input video sequence comprises footages from multiple video cameras capturing the same activities from different angles or perspectives, and wherein the video editing program performs on at least one of the footages one or more of: zooming, panning, and trapezoidal reshaping.

5. The video processing system of claim 1 wherein, to modify the sections of the input video sequence to conform to the known trope, the video editing program modifies one or more of: lighting conditions, transitions, contrasts, shadows, camera angles of close-up or distant shots of the participants, other persons or objects, color schemes, intensities of the activities occurring both in the foreground and the background, and placement of props.

6. The video processing system of claim 1, wherein the video editing program is further configured to supply missing sequences for a trope by drawing on modifiable sequences from film libraries, databases or publicly accessible resources.

7. The video processing system of claim 1, wherein the video editing program is configured to identify and obscure images of faces, to identify and avoid showing of body parts, to identify and obscure a predetermined type of information and to identify and eliminate or emphasize selected words in the audio track.

8. The video processing system of claim 1, wherein the examples of known cinematographic techniques comprise materials from any one or more of: external video libraries, the user's own collections of video sequences, and social media websites.

9. The video processing system of claim 1, wherein the video editing program, based on the detected or classified elements of cinematographic vocabulary in the examples of the known cinematographic techniques, is configured to perform one or more of: altering the relative positions of participants appearing in the video sequence, placing the participants close to each other in a close-up shot, introducing the participants by a wide-angle shot of an environment or background, and providing close-up shots of each participant individually, or the participants together.

10. The video processing system of claim 1, wherein the editing program is configured to modify the video sequence by one or more of: including content from an external source that relates to an identified landmark in the video sequence and replacing a background by a 3-dimensional background.

11. The video processing system of claim 10, wherein the video editing program handles administrative tasks relating to obtaining usage rights including content from the external source.

12. The video processing system of claim 11, wherein at least a subset of the footages is captured simultaneously using both the front and rear cameras on a portable device.

13. The video processing system of claim 11, wherein the footages capture participants of a teleconference, and wherein the virtual presence varies according to which of the participants of the teleconference is speaking.

14. The video processing system of claim 1, wherein when the input video sequence comprises footages captured in real time or simultaneously from cameras at two or more geographically separated locations.

15. The video processing system of claim 1, wherein the video editing program is configured to modify in a scene captured in the video sequence lighting, shadows or positioning of subjects and objects, based on a command or an automatically detected need, to create one of a predetermined set of moods.

* * * * *